United States Patent [19]

Watanabe

[11] Patent Number: 4,690,511
[45] Date of Patent: Sep. 1, 1987

[54] LIQUID CRYSTAL COLOR DISPLAY PANEL WITH MOSAIC COLOR FILTER

[75] Inventor: Haruo Watanabe, Tokyo, Japan

[73] Assignee: Citizen Watch Co., Ltd., Tokyo, Japan

[21] Appl. No.: 854,684

[22] Filed: Apr. 18, 1986

Related U.S. Application Data

[63] Continuation of Ser. No. 592,587, Mar. 23, 1984, abandoned.

[30] Foreign Application Priority Data

Mar. 31, 1983 [JP] Japan ................. 58-55623

[51] Int. Cl.⁴ ............................ G02F 1/13
[52] U.S. Cl. ............................ 350/339 F
[58] Field of Search ......... 350/339 R, 339 F, 341, 350/334, 349; 51/283 R; 357/30

[56] References Cited

U.S. PATENT DOCUMENTS

| | | | |
|---|---|---|---|
| 3,567,547 | 3/1971 | Mattson | 51/283 X |
| 3,787,110 | 1/1974 | Berreman et al. | 350/341 |
| 3,840,695 | 10/1974 | Fischer | 350/334 |
| 3,857,628 | 12/1974 | Strong | 350/337 |
| 3,860,399 | 1/1975 | Noble et al. | 51/283 |
| 3,865,469 | 2/1975 | Asai et al. | 350/339 F X |
| 3,966,302 | 6/1976 | Mikoda et al. | 350/334 |
| 3,981,558 | 9/1976 | Oh et al. | 350/350 R X |
| 4,006,968 | 2/1977 | Ernstoff et al. | 350/339 F |
| 4,042,294 | 8/1977 | Billings et al. | 350/345 |
| 4,183,629 | 1/1980 | Nishimura et al. | 350/334 |
| 4,196,973 | 4/1980 | Hochstrate | 350/345 |
| 4,252,414 | 2/1981 | Kinugawa et al. | 350/339 R |
| 4,295,923 | 10/1981 | Kasper | 357/30 X |
| 4,357,374 | 11/1982 | Ogawa | 350/349 X |
| 4,390,245 | 6/1983 | Shimizu et al. | 350/344 X |
| 4,410,887 | 10/1983 | Stolov et al. | 350/339 F |
| 4,552,437 | 11/1985 | Gantenbrink et al. | 350/339 F |
| 4,560,241 | 12/1985 | Stolov et al. | 350/339 F |
| 4,580,876 | 4/1986 | Stolov et al. | 350/339 R |
| 4,600,274 | 7/1986 | Morozumi | 350/339 F |

OTHER PUBLICATIONS

Berreman I "Electrooptical Properties of Twisted Nematic Structures" *Nonemissive Electrooptical Displays* ed. Kmetz et al, Plenum Press, N.Y. 1976.

Primary Examiner—Stanley D. Miller
Assistant Examiner—David Lewis
Attorney, Agent, or Firm—Koda and Androlia

[57] ABSTRACT

A liquid crystal color display panel using a mosaic color filter and a twisted nematic liquid crystal layer arranged between a pair of linear polarizers and driven by a mosaic array of dot electrodes. An auxiliary glass plate quite thin in thickness is bonded onto the mosaic color filter built on the inner surface of a transparent plate, and the mosaic array of dot electrodes is formed on the inner surface of the auxiliary glass plate. With this structure, the liquid crystal layer and the mosaic color filter are separated only by the extremely thin auxiliary glass plate, and, therefore, a color disregistration due to parallax is minimized. The fragile auxiliary glass plate is reinforced by the strong back transparent plate.

2 Claims, 3 Drawing Figures

LIQUID CRYSTAL COLOR DISPLAY PANEL WITH MOSAIC COLOR FILTER

This is a continuation of application Ser. No. 592,587, filed Mar. 23, 1984 abandoned.

BACKGROUND OF THE INVENTION

1. Field of the Invention

This invention relates to a color display panel in which a liquid crystal light switching array and a mosaic color filter are combined.

2. Prior Art

One example of such color display panels is disclosed in U.S. Pat. No. 3,840,695 issued to Fischer. This display panel comprises a light switching array having a twisted nematic liquid crystal layer interposed between a pair of polarizers, and a mosaic color filter provided on the outer surface of the light switching array. In this display panel, the liquid crystal layer and the color filter are vertically spaced. As a result, when the panel is viewed in an oblique direction, a color disregistration will occur due to parallax. This phenomenon is a serious drawback especially in a high resolution display panel having a fine mosaic color filter. To eliminate this drawback, an arrangement in which the liquid crystal is in direct contact with the color filter has been proposed. However, such an arrangement has its drawbacks such as contamination of liquid crystal by the color filter and drop in effective voltage. Therefore, the object of the invention is to minimize a color disregistration in a color display panel by bringing the liquid crystal close to the color filter to the very limit but not making them into contact with each other.

SUMMARY OF THE INVENTION

To attain this object, according to the invention, a liquid crystal colon display panel comprises a twisted nematic liquid crystal layer exhibiting the property of rotating the polarization plane of transmitted light in response to one of the presence and the absence of an electric field across the liquid crystal layer; a front transparent plate having a front transparent electrode on one surface thereof facing the liquid crystal layer; a composite plate having a back transparent plate and an auxiliary glass plate thin as compared with the back transparent plate, the back transparent plate having a mosaic color filter on the inner surface thereof, the axuiliary glass plate being bonded on the mosaic color filter by a bonding agent, and the one surface of the auxiliary glass plate facing the liquid crystal layer being provided with a back transparent electrode with a mosaic array of dot electrodes in exact registration with the mosaic color filter; and a pair of linear polarizers, one of the polarizers being provided on an outer surface of the front transparent plate and the other of the polarizers being provided on an outer surface of the back transparent plate. In this structure, the mosaic color filter and the liquid crystal layer are separated only by the quite thin auxiliary glass plate, and the fragile auxiliary glass plate is reinforced by the thicker back transparent plate.

DETAILED DESCRIPTION OF THE INVENTION

For a better understanding of this invention, referring now to FIGS. 1 and 2, prior art structures of liquid crystal color display panels will be discussed.

Figure 1:
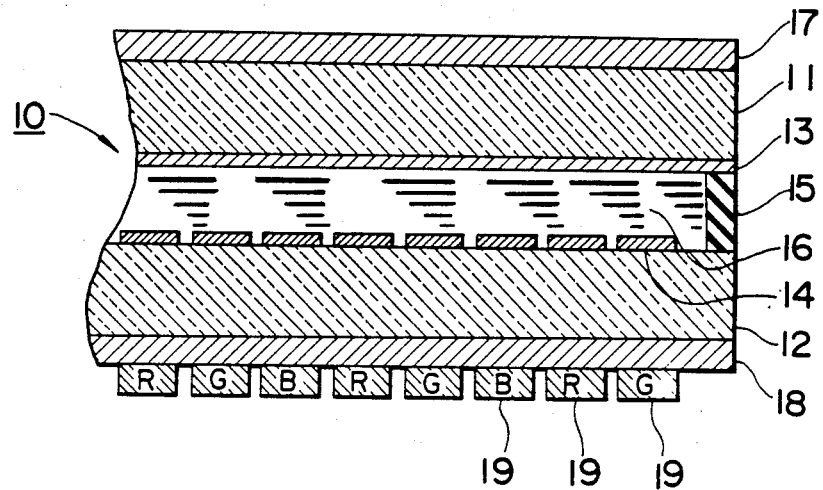
FIG. 1 is a vertical sectional view of a prior art liquid crystal color display panel.
Figure 2:
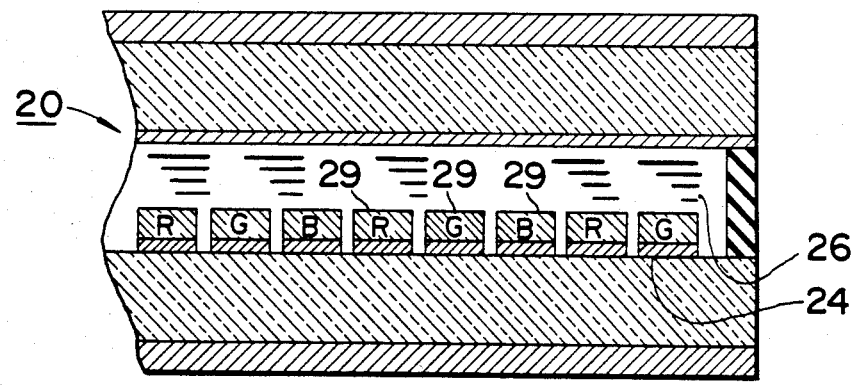
FIG. 2 is a vertical sectional view of another prior art liquid crysal color display panel.

FIG. 1 shows a liquid crystal color display panel 10 disclosed in U.S. Pat. No. 3,840,695 to Fischer. A front transparent plate 11 having a front transparent electrode 13 on the inner surface thereof, and a back transparent plate 12 having a back transparent electrode 14 with a mosaic array of dot electrodes on the inner surface thereof are arranged in parallel with each other, with a gasket 15 sandwitched therebetween.

A 90° twisted namatic liquid crystal layer 16 is interposed between the pair of transparent plates 11 and 12. The outer surface of the front transparent plate 11 is provided with a front linear polarizer 17 and the outer surface of the back transparent plate 12 is provided with a back linear polarizer 18 so that the polarization axes of the polarizers 17 and 18 are parallel with each other. On the outer surface of the back linear polarizer 18 is a mosaic color filter 19 with a mosaic array of red, green and blue filter elements in exact registration with the back transparent electrode 14. The display panel 10 is observed from the front (top of the figure) and illuminated by a light source (not shown) located at the rear (bottom of the figure). In the absence of an electric field across the liquid crystal layer 16, as the polarization plane of the polarized light passing through the back linear polarizer 18 is rotated 90° by the twisted nematic liquid crystal layer 16, the polarized light cannot pass through the front linear polarizer 17.

On the other hand, when a voltage is applied between the front transparent electrode 13 and the back transparent electrode 14, the twisted texture of the liquid crystal layer 16 is temporarily broken, and as a result, the polarized light passing through the back linear polarizer 18 is not modulated by the liquid crystal layer 16 and passes through the front linear polarizer 17. In this way, by driving selectively the mosaic transparent electrode 14 facing the mosaic color filter 19, red, green and blue light can be selectively observed. In an actual display panel, these color lights are combined to reproduce natural colors.

With this color display panel 10, since the thick transparent plate 12 and polarizer 18 are interposed between the liquid crystal layer 16 and the color filter 19, a color disregistration due to parallax cannot be neglected, when the panel is viewed in an oblique direction.

Now, assume that the display panel is observed at a distance of about three times as long as the width of the display panel from the front. Then the color disregistration at the peripheral edge of the panel becomes 1/6 of the distance between the liquid crystal layer 16 and the color filter 19. The minimum thickness of the transparent plate 12 is required to be about 500μ from the viewpoint of its strength and the thickness of the polarizer 18 is usually about 100μ. Therefore, the above-mentioned distance is about 600μ. As a result, a color disregistration of about 100μ cannot be avoided. In a high resolution color display panel having a mosaic filter densely deposited, such about 100μ color disregistration is a serious problem. To eliminate this problem, a liquid crystal color display panel as shown in FIG. 2 has been proposed. With this display panel 20, the arrangement of the component parts is similar to that of FIG. 1 with the exception that a mosaic color filter 29 is directly coated on the surface of a back transparent electrode 24 with a mosaic array of dot electrodes.

It is obvious that this display panel 20 will not cause any color disregistration, regardless of the direction of the observation. However, the following disadvantages make this display panel 20 impractical: First, since the color filter 29 usually made of polymer and dye is in direct contact with a liquid crystal layer 26, the contamination of the liquid crystal layer owing to a chemical reaction cannot be avoided. Secondly, the electric polarization of the color filter 29 causes the effective voltage applied to the liquid crystal layer 26 to drop, making the normal driving difficult.

Figure 3:
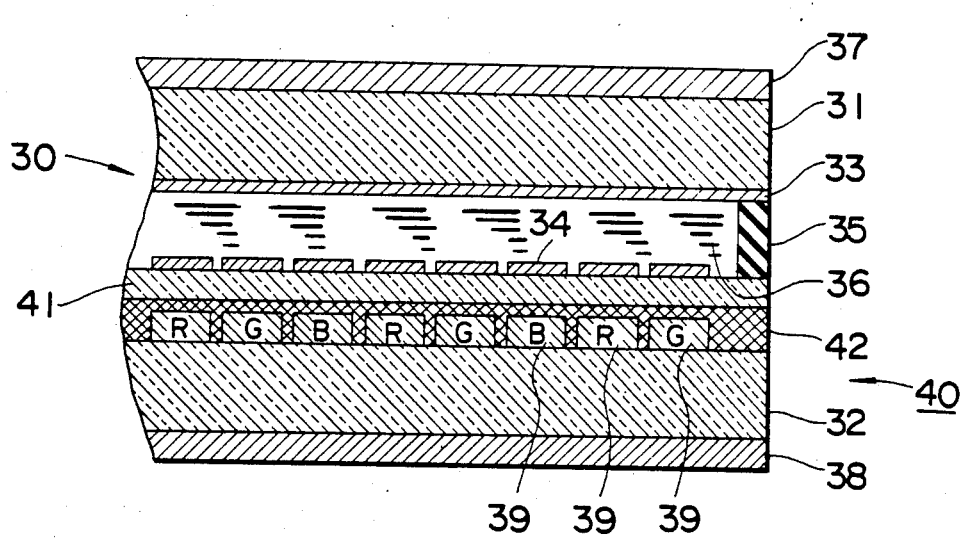
FIG. 3 is a vertical sectional view of a liquid crystal panel according to this invention.

Referring now to FIG. 3, there is shown the structure of a liquid crystal display panel 30 according to the present invention. A front transparent plate 31 having a front transparent electrode 33 on the inner surface thereof is similar to those in prior art shown in FIGS. 1 and 2. The display panel of the present invention is characterized by its back plate. This back plate comprises a composite plate 40 formed of a relatively thick transparent plate 32 and a quite thin auxiliary glass plate 41. A color filter 39 with a mosaic array of red, green and blue filter elements is built onto the inner surface of the back transparent plate 32 and the auxiliary glass plate 41 is bonded thereon by a bonding agent 42. The inner surface of the auxiliary glass plate 41 is provided with a back transparent electrode 34 with a mosaic array of dot electrodes in exact registration with the mosaic filter 39. The front transparent plate 31 and the composite plate 40 are arranged in parallel with each other, with a gasket 35 sendwiched therebetween. A 90° twisted nematic liquid crystal layer 36 is interposed between the front transparent plate 31 and the composite plate 40. The outer surface of the front transparent plate 31 is provided with a front linear polarizer 37 and the outer surface of the back transparent plate 32 is provided with a back linear polarizer 38. The composite plate 40 of the invention will be explained through the use of two examples.

EXAMPLE 1

As the back transparent plate 32, a acryl plate of a thickness of 2 mm was used and a color filter 39 with a mosaic array of red, green and blue fliter elements was formed on the surface of the plate 32 by a screen printing method. The pitch of the mosaic filter elements 39 was 350$\mu$. On the other hand, as the auxiliary glass plate 41, a quite thin glass plate of a thickness of 200$\mu$ (e.g. No. 0211 made by Coning Glass) was used, and on the surface, a transparent conductive film of indium oxide was vacuum deposited and then patterned by etching to form the back transparent electrode 34 with a mosaic array of dot electrodes having a pitch of 350$\mu$. Next, the back transparent plate 32 having a mosaic filter 39 and the auxiliary glass plate 41 having a back transparent electrode 34 are bonded by an epoxy bonding agent 42 to form a composite plate 40.

In the color display panel 30 constructed using this composite plate 40, the vertical distance between the liquid crystal layer 36 and the color filter 39 is about 210$\mu$ and a color disregistration due to parallax is about 35$\mu$. This value is tolerated in the field of practical use as compared with the pitch of 350$\mu$ of the mosaic array.

EXAMPLE 2

As the back transparent plate 32, a glass plate of a thickness of 1.5 mm was used and a mosaic color filter 39 of a pitch of 250$\mu$ was formed on the surface of the plate 32 in the same method as in Example 1. Next, a glass plate of a thickness of 300$\mu$ was bonded onto this color filter 39 and then polished to reduce the thickness to about 100$\mu$. On the inner surface of the auxiliary glass plate 41 thus thinned, a transparent conductive film was vacuum deposited and patterned to form the back transparent electrode 34 with a mosaic array of dot electrodes with a pitch of 250$\mu$.

In the display panel 30 constructed using the composite plate 40, the vertical distance between the liquid crystal layer 36 and the color filter 39 is about 110$\mu$ and the color disregistration due to parallax is less than about 20$\mu$.

As mentioned above, according to the display panel 30 of the invention, since reinforced by the strong back transparent plate 32, the auxiliary glass plate 41 can be extremely reduced in thickness, e.g. to less than 200$\mu$, thereby minimizing the above-mentioned color disregistration.

With respect to the arrangement of the mosaic color filter 39, in general, the tricolor filter elements of red (R), green (G) and blue (B) are arranged alternatively. However, an arrangement which doubles the frequency of the G filter element, that is, R-G-B-G-R-G-B-G . . . or an arrangement which interposes a black filter element X, that is, R-X-G-X-B-X-R-X . . . is available. As the twisted nematic liquid crystal layer 36, in general, a liquid crystal having a positive dielectric anisotropy is used. However, a liquid crystal having a negative dielectric anisotropy is also usable, and in this case, in the presence of the electric field, the liquid crystal layer 36 is of a twisted structure and in the absence of the electric field, it is of a homeotropic structure.

When using a liquid crystal 36 exhibiting a 90° twisted structure in the absence of the electric field, the pair of linear polarizers 37, 38 are generally arranged so that their polarization axes are parallel. Instead of this parallel arrangement, a perpendicular arrangement is available. In this case, a light switching property of the panel is reversed.

As previously explained, in the panel of the invention, since the liquid crystal layer and the color filter are separated only by a quite thin auxiliary glass plate, a color disregistration is mimimized and contamination of the liquid crystal by the filter is prevented. This fragile auxiliary glass plate is reinforced by the thicker back transparent plate so that the panel of the invention is fit for practical use.

What is claimed is:

1. A liquid crystal color display panel comprising:
   a first polarizer;
   a first transparent plate having said first polarizer on its outer surface;
   a color filter having a mosaic array of red, green and blue filter elements provided on an inner surface of said first transparent plate;
   a glass plate bonded on said color filter by a bonding agent, said glass plate being less than 200 $\mu$m in thickness and thin as compared with said first plate;
   a plurality of transparent electrodes provided on an inner surface of said glass plate each in exact registration with each of the filter elements of said color filter;

a twisted nematic liquid crytal surrounded by a gasket and accommodated on the inner surfaces of said plurality of transparent electrodes and said glass plate, said twisted nematic liquid crystal exhibiting a property of rotating the polarization plane of transmitted light in response to one of the presence and the absence of an electric field across said liquid crystal layer;

at least one common electrode layer provided in contact with an inner surface of said liquid crystal layer;

a second transparent plate having said common electrode layer on its inner surface, said inner surface opposing said inner surface of said glass plate; and a second polarizer provided on an outer surface of said transparent plate.

2. A liquid crystal color display panel according to claim 1, wherein said twisted nematic liquid crystal layer exhibits the property of rotating the polarization plane of transmitted light by 90° in the absence of an electric field and said pair of linear polarizers are arranged such that their polarization axes are parallel with each other.

* * * * *